United States Patent
Kimoto et al.

(10) Patent No.: US 12,190,004 B2
(45) Date of Patent: Jan. 7, 2025

(54) PROCESSING APPARATUS, COMPUTER-READABLE STORAGE MEDIUM, AND METHOD FOR DETERMINING WHETHER TO RESTRICT EXECUTION OF PARTICULAR PROCESS

(71) Applicant: BROTHER KOGYO KABUSHIKI KAISHA, Nagoya (JP)

(72) Inventors: Taichiro Kimoto, Nagoya (JP); Shunsuke Minamikawa, Nagoya (JP); Koichi Tsugimura, Nagoya (JP); Yushi Deura, Nagoya (JP); Yuki Kitahashi, Setagaya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/487,300

(22) Filed: Oct. 16, 2023

(65) Prior Publication Data

US 2024/0126488 A1 Apr. 18, 2024

(30) Foreign Application Priority Data

Oct. 17, 2022 (JP) .................................. 2022-166479

(51) Int. Cl.
*G06F 3/12* (2006.01)
*B41J 29/38* (2006.01)

(52) U.S. Cl.
CPC ............ *G06F 3/1239* (2013.01); *B41J 29/38* (2013.01); *G06F 3/1222* (2013.01)

(58) Field of Classification Search
None
See application file for complete search history.

(56) References Cited

U.S. PATENT DOCUMENTS

| | | | |
|---|---|---|---|
| 2016/0011554 A1* | 1/2016 | Shipman | G06F 21/10 399/81 |
| 2021/0178772 A1 | 6/2021 | Sahara | |

FOREIGN PATENT DOCUMENTS

JP    2021-094705 A    6/2021

\* cited by examiner

*Primary Examiner* — Lennin R Rodriguezgonzalez
(74) *Attorney, Agent, or Firm* — Merchant & Gould P.C.

(57) ABSTRACT

A processing apparatus includes a consumer receptacle and a controller to determine whether the processing apparatus is in a contracted status where a delivery contract for consumables is concluded or in an uncontracted status before the delivery contract is concluded. The consumable receptacle is configured to hold any of an exclusive consumable that is unusable when the processing apparatus is in the uncontracted status and a non-exclusive consumable different from the exclusive consumable. When the processing apparatus is in the contracted status, and the non-exclusive consumable is held in the consumable receptacle, the controller determines whether a specific condition for execution of a first particular process in which the non-exclusive consumable is consumed is satisfied. The controller allows the execution of the first particular process when the specific condition is satisfied, whereas restricting the execution of the first particular process when the specific condition is not satisfied.

9 Claims, 9 Drawing Sheets

UNCONTRACTED MODE

PROCESSING APPARATUS, COMPUTER-READABLE STORAGE MEDIUM, AND METHOD FOR DETERMINING WHETHER TO RESTRICT EXECUTION OF PARTICULAR PROCESS

REFERENCE TO RELATED APPLICATIONS

This application claims priority from Japanese Patent Application No. 2022-166479 filed on Oct. 17, 2022. The entire content of the priority application is incorporated herein by reference.

BACKGROUND ART

Heretofore, a technology has been known in which when a tank (hereinafter, which may be referred to as a "cartridge") attached to an inkjet printer does not satisfy any of particular conditions, a sub-tank is not replenished with ink from the cartridge, whereas the sub-tank is replenished with ink from the cartridge when the cartridge satisfies one of the particular conditions. The case where any of the particular conditions is not satisfied denotes a case where none of the following first to third conditions is satisfied. The first condition is that a particular type of cartridge is attached in a contracted status where a predetermined contract is in effect. The second condition is that a general type of cartridge, different from the particular type of cartridge, is attached in the contracted status where the predetermined contract is in effect. The third condition is that the general type of cartridge is attached in an uncontracted status where the predetermined contract is not in effect. An example case where none of the first to third conditions is satisfied is a case where the particular type of cartridge is attached in the uncontracted status where the predetermined contract is not in effect.

DESCRIPTION

In the aforementioned known technology, it is determined whether one of the particular conditions is satisfied, based on the combination of the type of the cartridge attached and the status of the printer that indicates whether the printer is in the contracted status or in the uncontracted status. According to whether one of the particular conditions is satisfied, it is determined whether ink is to be supplied from the cartridge to the sub-tank.

However, even though the status of the printer and the type of the cartridge attached are common among different situations of the printer, more appropriate processing may be achieved if suitable control is performed for each of the situations finely separated according to a plurality of statuses such as an attachment status of the cartridge that is a consumable, and a printing status that is an operating status of the printer.

Aspects of the present disclosure are advantageous for providing one or more improved techniques for a processing apparatus that make it possible to achieve more appropriate processing by performing suitable control for each of situations finely separated according to a contract status for consumables, a usage status of the consumables in the processing apparatus, and an operating status of the processing apparatus.

According to aspects of the present disclosure, a processing apparatus is provided, which includes a consumable receptacle and a controller. The consumable receptacle is configured to hold any of a first consumable and a second consumable. The first consumable is usable when the processing apparatus is in a first status. The second consumable is different from the first consumable. The controller is configured to determine whether the processing apparatus is in the first status or in a second status different from the first status. The controller is further configured to, in response to determining that the processing apparatus is in the first status, determine whether a specific condition for execution of a first particular process using the second consumable is satisfied, when the second consumable is held in the consumable receptacle. The controller is further configured to determine whether to allow or restrict the execution of the first particular process using the second consumable depending on whether the specific condition is satisfied, thereby allowing the execution of the first particular process in response to determining that the specific condition is satisfied, whereas imposing a restriction on the execution of the first particular process in response to determining that the specific condition is not satisfied.

According to aspects of the present disclosure, further provided is a non-transitory computer-readable storage medium storing computer-readable instructions that are executable by a controller of a processing apparatus including a consumable receptacle. The instructions are configured to, when executed by the controller, cause the processing apparatus to determine whether the processing apparatus is in a first status or in a second status different from the first status. The consumable receptacle is configured to hold any of a first consumable and a second consumable. The first consumable is usable when the processing apparatus is in the first status. The second consumable is different from the first consumable. The instructions are further configured to, when executed by the controller, cause the processing apparatus to, in response to determining that the processing apparatus is in the first status, determine whether a specific condition for execution of a first particular process using the second consumable is satisfied, when the second consumable is held in the consumable receptacle. The instructions are further configured to, when executed by the controller, cause the processing apparatus to determine whether to allow or restrict the execution of the first particular process using the second consumable depending on whether the specific condition is satisfied, thereby allowing the execution of the first particular process in response to determining that the specific condition is satisfied, whereas imposing a restriction on the execution of the first particular process in response to determining that the specific condition is not satisfied.

According to aspects of the present disclosure, further provided is a method implementable on a controller of a processing apparatus including a consumable receptacle. The method includes determining whether the processing apparatus is in a first status or in a second status different from the first status. The consumable receptacle is configured to hold any of a first consumable and a second consumable. The first consumable is usable when the processing apparatus is in the first status. The second consumable is different from the first consumable. The method further includes determining, in response to determining that the processing apparatus is in the first status, whether a specific condition for execution of a first particular process using the second consumable is satisfied, when the second consumable is held in the consumable receptacle. The method further includes determining whether to allow or restrict the execution of the first particular process using the second consumable depending on whether the specific condition is satisfied, thereby allowing the execution of the first particular process in response to determining that the specific condition is satisfied, whereas imposing a restriction on the execution of the first particular process in response to determining that the specific condition is not satisfied.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

An illustrative embodiment according to aspects of the present disclosure will be described with reference to the accompanying drawings. In the illustrative embodiment, a printer will be explained as an example of a processing apparatus according to aspects of the present disclosure. However, practicable examples of the processing apparatus according to aspects of the present disclosure are not limited to the printer in the illustrative embodiment.

Overall Configuration of Print Management System

Figure 1:
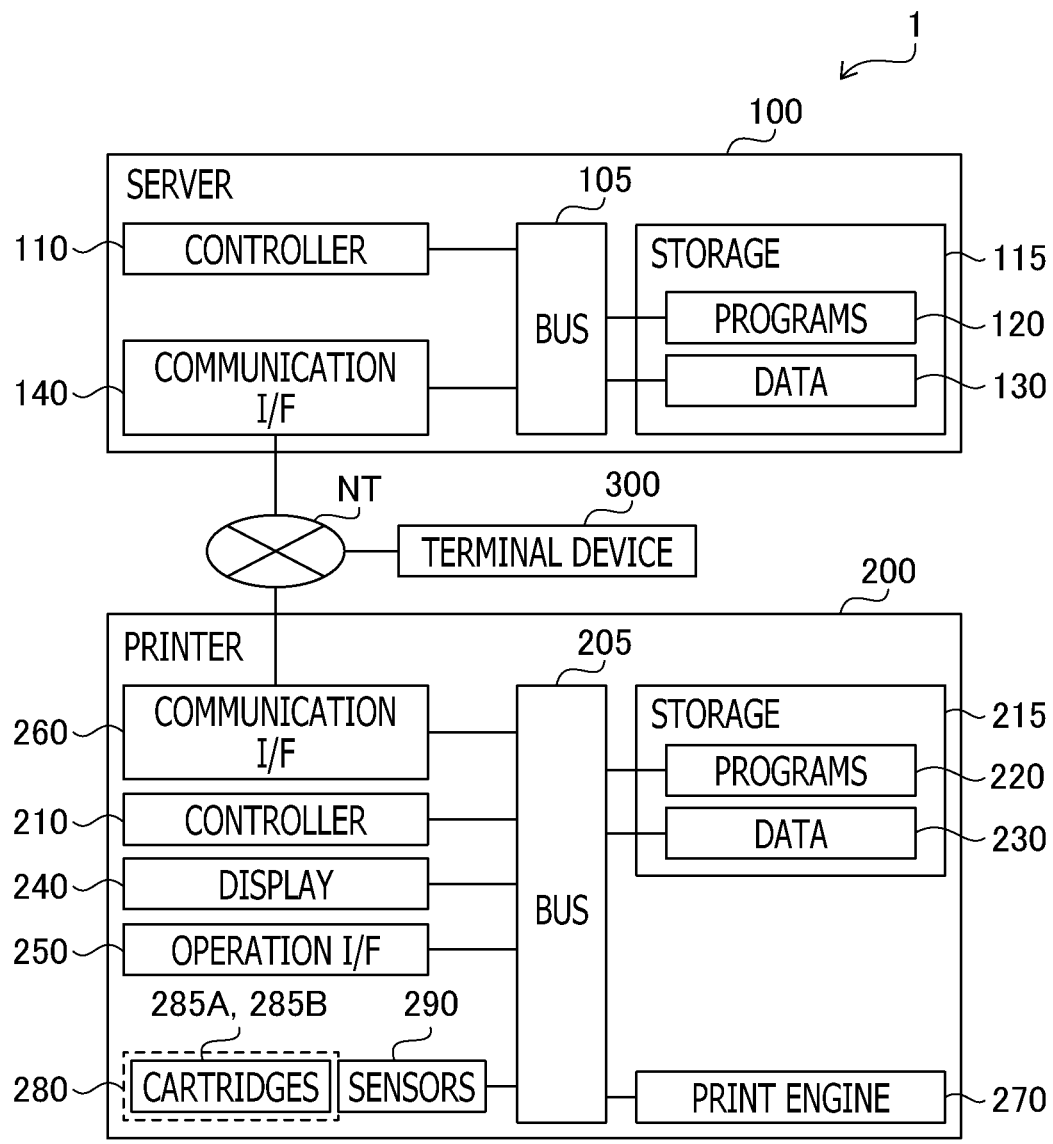
FIG. 1 shows an example of an overall configuration of a print management system.

FIG. 1 shows an example of an overall configuration of a print management system 1 including a printer 200. As shown in FIG. 1, the print management system 1 includes a server 100, the printer 200, and a terminal device 300. The server 100, the printer 200, and the terminal device 300 are communicably connected with each other via a network NT.

Server

The server 100 is, for instance, a server installed and managed by a manufacturer of the printer 200. The server 100 may be a stand-alone "server" or may be a "server unit" including a plurality of servers. The server 100 is configured to manage a plurality of printers 200 to be managed. The server 100 includes a controller 110, a storage 115, and a communication I/F ("I/F" is an abbreviation for "interface") 140. The controller 110, the storage 115, and the communication I/F 140 are communicably interconnected via a bus 105, thus enabling transmission and reception of information from one element to another among them.

The storage 115 includes, for instance, a RAM, a ROM, an EEPROM, and an HDD. The storage 115 stores therein various programs 120 and various types of data 130. The various types of data 130 include, for instance, a cumulative number of charged pages that is an accumulated value of the number of charged pages as purchased by a user.

The controller 110 includes a processor such as a CPU, and is configured to perform data processing. Specifically, for instance, the controller 110 is configured to execute the programs 120 stored in the storage 115. The controller 110 is further configured to perform various types of processing, which include data communication with the printer 200 and the terminal device 300 that are connected with the network NT. The communication I/F 140 is connected with the network NT, and is configured to communicate with the printer 200 and the terminal device 300.

Printer

For instance, the printer 200 is owned by the user. The printer 200 is configured to switch between a "contracted mode" and an "uncontracted mode." The "contracted mode" is a mode corresponding to a contracted status in which a delivery contract for contract cartridges 285A is in effect. A contract cartridge 285A is a cartridge that is unusable in an uncontracted status in which the delivery contract is not in effect. In the "contracted mode," the printer 200 performs printing by using (consuming) the contract cartridges 285A, which are, for example, ink cartridges, within an allowed number of printable pages. The "uncontracted mode" is a mode corresponding to the uncontracted status in which the delivery contract for the contract cartridges 285A is not in effect. In the "uncontracted mode," the printer 200 performs printing by using (consuming), for instance, commercial cartridges 285B, which are commercially available ink cartridges, with no limitation on the number of printable pages. The commercial cartridge 285B is different from the contract cartridge 285A, and is a cartridge that the user is allowed to purchase and use himself regardless of whether the delivery contract for the contract cartridges 285A is in effect. In the illustrative embodiment, when the contract cartridge 285A and the commercial cartridge 285B are referenced without distinction therebetween, they may simply be referred to as the "cartridge 285." It is noted that "printing by using (consuming) the contract cartridges 285A" may refer to "printing by consuming ink in the contract cartridges 285A."

The printer 200 includes a controller 210, a storage 215, a display 240, an operation I/F 250, a communication I/F 260, a print engine 270, cartridge holders 280, and cartridge sensors 290. The controller 210, the storage 215, the display 240, the operation I/F 250, the communication I/F 260, and the print engine 270 are communicably interconnected via a bus 205, thus enabling transmission and reception of information from one element to another among them.

The storage 215 stores therein various programs 220 and various types of data 230. The various programs 220 include, for instance, programs that, when executed by the controller 210, cause the printer 200 to perform processes as shown in FIGS. 4 to 8B. The various types of data 230 include, for instance, image data to be printed, the aforementioned cumulative number of charged pages, and a cumulative use number of printed pages that is counted up when printing based on a print job is performed.

The storage 215 further stores contract information (not shown) indicating whether a current mode is the "uncontracted mode" or the "contracted mode." The contract information takes a first value (e.g., 0) in the "uncontracted mode" and a second value (e.g., 1) in the "contracted mode." For instance, when the printer 200 is turned on, the controller 210 makes a transition to one of the "uncontracted mode" and the "contracted mode" according to the contract information stored in the storage 215. In another instance, the controller 210 may rewrite the contract information stored in the storage 215 from the "uncontracted mode" to the "contracted mode" based on an instruction from the server 100, in response to a process of concluding the contract for the printer 200 being performed between the terminal device 300 and the server 100. In such a case, the controller 210 may rewrite the contract information stored in the storage 215 from the "contracted mode" to the "uncontracted mode" based on an instruction from the server 100, in response to a process of cancelling the contract for the printer 200 being performed between the terminal device 300 and the server 100.

The controller 210 includes a processor such as a CPU, and is configured to perform data processing. Specifically, for instance, the controller 210 is configured to execute various programs stored in the storage 215. The display 240 includes, for instance, a liquid crystal display device, and is configured to display various types of information. The operation I/F 250 includes, for instance, a keyboard and operable buttons, and is configured to receive user input operations. The user is allowed to input various instructions into the printer 200 by operating the operation I/F 250. The communication I/F 260 is connected with the network NT and configured to communicate with the server 100 and the terminal device 300. The print engine 270 is configured to print an image on a printing sheet, for instance, in an inkjet method, while conveying the printing sheet by a sheet conveyor (not shown).

The printer 200 includes a plurality of cartridge holders 280, each of which accommodates any type of the contract cartridge 285A and the commercial cartridge 285B. In the printer 200, each individual cartridge holder 280 is configured to receive any type of the cartridges 285A and 285B in such a manner as to be replaceable with a new cartridge 285A or 285B when the attached cartridge 285A or 285B is out of ink. In another instance, the printer 200 may have a plurality of specific cartridge holders 280 provided separately for each type of the contract cartridge 285A and the commercial cartridge 285B. The contract cartridges 285A include a cartridge for each of a plurality of ink colors such as cyan, magenta, yellow, and black. Likewise, the commercial cartridges 285B include a cartridge for each of a plurality of ink colors such as cyan, magenta, yellow, and black. The plurality of cartridge holders 280 of the printer 200 are for respective different ink colors. There may be a cartridge-mixed state where different types of cartridges 285A and 285B are attached to the plurality of cartridge holders 280. Namely, some of the cartridge holders 280 of the printer 200 may hold the contract cartridges 285A, and the other cartridge holders 280 may hold the commercial cartridges 285B. For instance, such a cartridge-mixed state may be caused in a case where after the contract cartridges 285A for some ink colors are consumed, the commercial cartridges 285B for the same ink colors are used until new contract cartridges 285A for replacement are delivered.

The print engine 270 is configured to perform a printing process while consuming ink from the contract cartridge 285A or the commercial cartridge 285B. A cartridge sensor 290 is disposed at each cartridge holder 280. Each cartridge sensor 290 is configured to read and write cartridge information from and to an IC chip provided to the cartridge 285 attached to the corresponding cartridge holder 280. For instance, each cartridge sensor 290 may read the cartridge information from the IC chip to detect the type of the cartridge 285 attached to the corresponding cartridge holder 280, i.e., to detect whether the attached cartridge 285 is a contract cartridge 285A or a commercial cartridge 285B.

Terminal Device

The terminal device 300 is a mobile terminal such as a smartphone owned by the user. The terminal device 300 is connected with the network NT via wireless communication. Although the following features are not shown in any drawings, the terminal device 300 includes a controller, a memory, and a communication I/F configured to connect with the network NT. The memory stores various programs. The controller is configured to execute the various programs stored in the memory.

The terminal device 300 further includes a touch panel with a liquid crystal display and a touch pad integrally combined. The touch panel is configured to display various types of information and accept various input operations by the user. The user is allowed to operate the touch panel, thereby inputting various instructions into the terminal device 300. Examples of the terminal device 300 may include, but are not limited to, a tablet PC, a notebook PC, and a desktop PC, as well as the smartphone.

Printing in Uncontracted Mode and Contracted Mode of Print Management System

Figure 2:
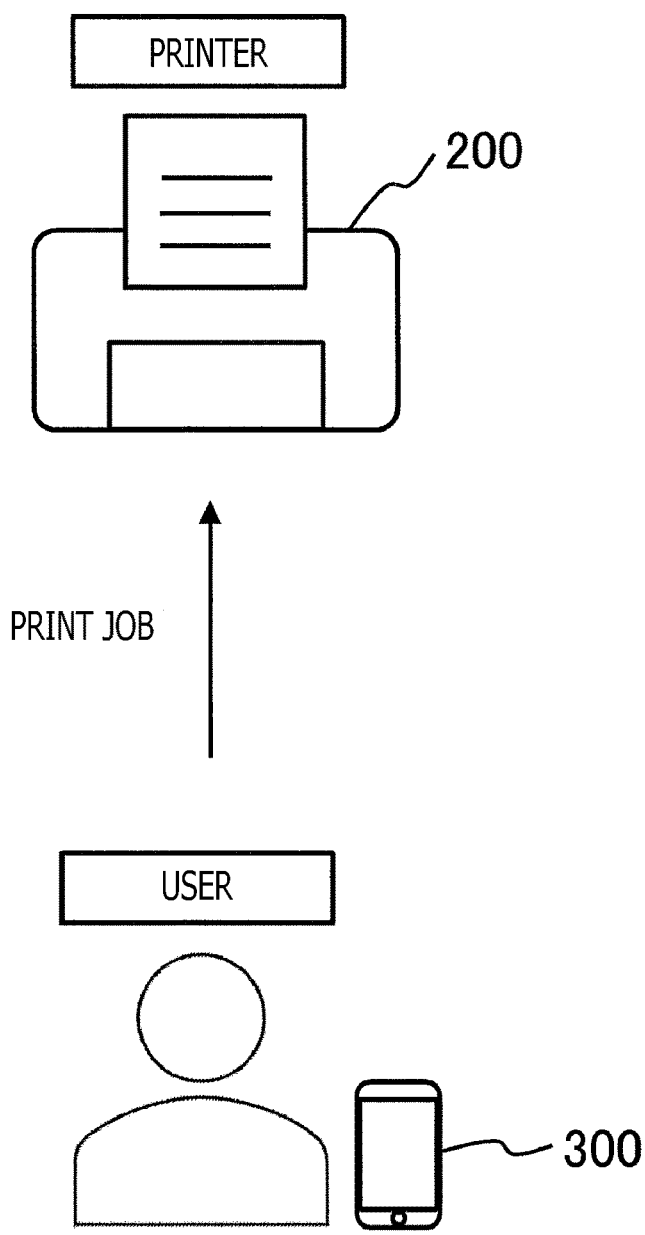
FIG. 2 shows an example of printing by the print management system in an "uncontracted mode."

As described above, the printer 200 is configured to switch between the "contracted mode" in which the printer 200 performs printing by using (consuming) the contract cartridges 285A within the allowed number of printable pages, and the "uncontracted mode" in which the printer 200 performs printing by using the commercial cartridges 285B with no limitation on the number of printable pages. FIG. 2 shows an example of printing by the print management system 1 in the "uncontracted mode." As shown in FIG. 2, in the "uncontracted mode," when a print job is sent from the user's terminal device 300, the printer 200 performs printing based on the print job by using the commercial cartridges 285B with no limit on the number of printable pages. When a currently-used commercial cartridge 285B is out of ink, the user purchases a new commercial cartridge 285B and replaces the consumed commercial cartridge 285B with the new commercial cartridge 285B. The print job may not necessarily be received from the terminal device 300, but may be received via the operation I/F 250 of the printer 200 in response to a user operation.

Figure 3:
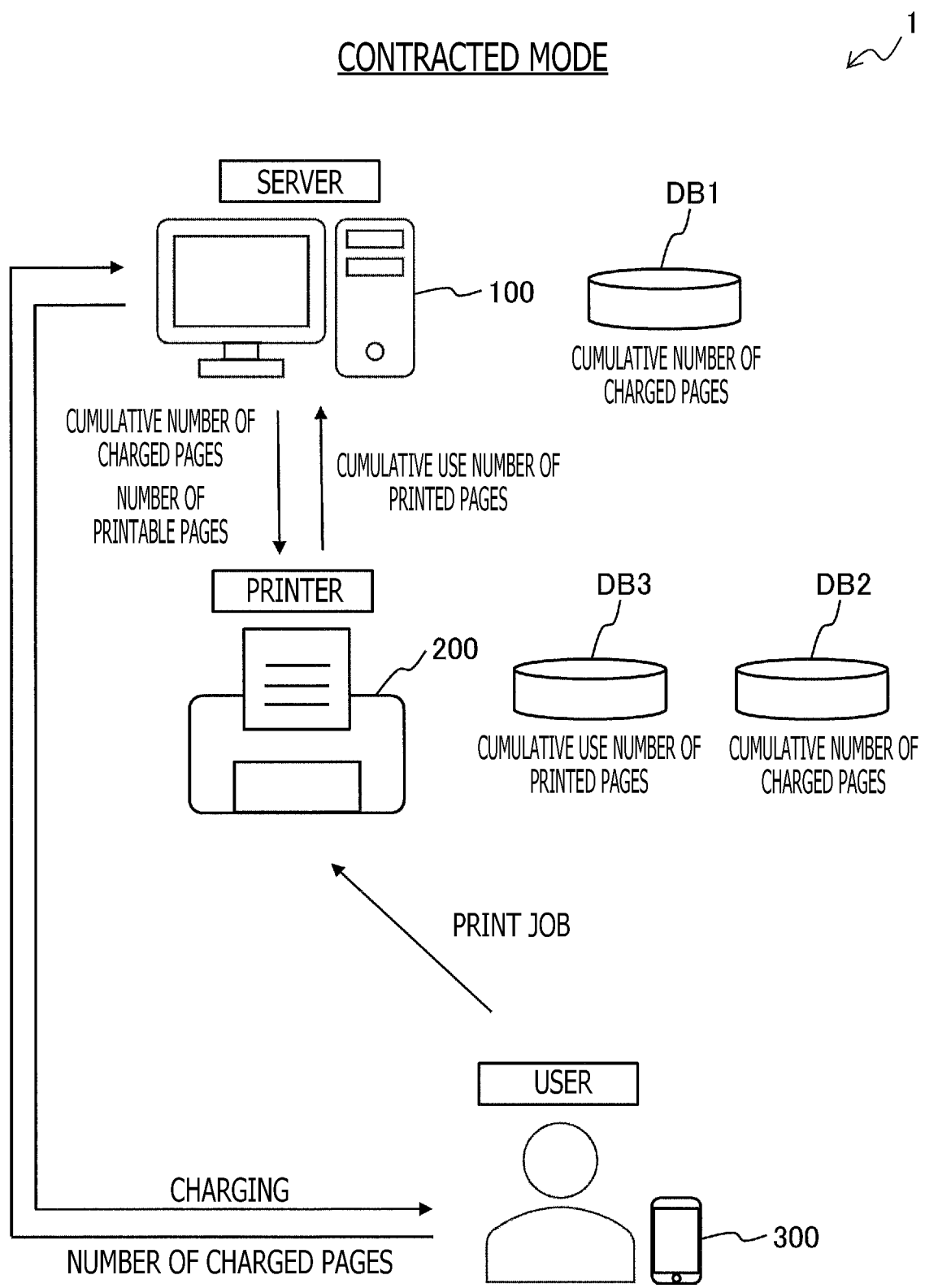
FIG. 3 shows an example of printing by the print management system in a "contracted mode."

FIG. 3 shows an example of printing by the print management system 1 in the "contracted mode." As shown in FIG. 3, the user newly purchases a particular number of charged pages by paying a charge for printing to be performed. Specifically, for instance, the user purchases the particular number of charged pages by bearing a financial burden in a so-called prepaid method. When the user operates the terminal device 300 to make a request for purchase of the particular number of charged pages, identification information of the terminal device 300 and the purchase request are sent to the server 100. In response to receiving the purchase request, the controller 110 of the server 100 determines whether the printer 200 identified by identification information of the printer 200 is in the "contracted mode" based on the identification information of the printer 200 that is previously registered in association with the identification information of the terminal device 300. In response to determining that the printer 200 identified by identification information of the printer 200 is in the "contracted mode," the server 100 performs payment processing for the particular number of charged pages and adds the particular number of charged pages as newly purchased by the user to a cumulative number of charged pages for the printer 200. The cumulative number of charged pages is an accumulated value of the number of charged pages as purchased by the user. The cumulative number of charged pages is stored for each printer 200 or for each user in a database DB1 of the storage 115 of the server 100. The updated value of the cumulative number of charged pages or the value of the particular number of charged pages as newly purchased is sent to the printer 200 as well. Thereby, the cumulative number of charged pages stored in the database DB2 in the storage 215 of the printer 200 is also updated. The process of adding the particular number of charged pages as newly purchased to the cumulative number of charged pages may be performed by the controller 210 of the printer 200. In response to determining that the printer 200 is not in the "contracted mode," the server 100 provides to the terminal device 300 a notification that it is not possible to purchase an additional number of charged pages.

In response to receiving the print job from the user's terminal device 300, the controller 210 of the printer 200 makes an inquiry to the server 100 about the number of printable pages, and obtains the number of printable pages from the server 100. The number of printable pages for the printer 200 is a value obtained by subtracting an aftermentioned cumulative number of printed pages from the cumulative number of charged pages. The number of printable pages may be calculated by the controller 110 of the server 100 or by the controller 210 of the printer 200. When the number of printable pages is one or more, the controller 210 of the printer 200 may perform printing within a printable range, i.e., until the number of printable pages becomes zero. The controller 210 of the printer 200 counts up the cumulative number of printed pages by the number of pages used for printing. The cumulative number of printed pages is an accumulated value of the number of pages used for printing by the printer 200. The cumulative number of printed pages is stored in the database DB3 in the storage 215 of the printer 200. The controller 210 of the printer 200 periodically sends the value of the cumulative number of printed pages used to the server 100 at predetermined transmission timing. In response to receiving the print job, the controller 210 of the printer 200 performs printing while consuming the number of printable pages. The print job may not necessarily be received from the terminal device 300, but may be received via the operation I/F 250 of the printer 200 in response to a user operation.

The controller 110 of the server 100 periodically performs a charging process at predetermined timing. The charging process is a process of charging a fee to be paid by the user, to the terminal device 300 based on the cumulative number of printed pages. Based on an instruction from the server 100, a transaction server different from the server 100 may perform the charging process.

The operations described above are printing operations when the contract cartridges 285A are attached to the cartridge holders 280. Even though the printer 200 is in the "contracted mode," when the commercial cartridges 285B are attached to the cartridge holders 280, the number of pages used for printing with the commercial cartridges 285B is not subject to fee-charging since the user has purchased the commercial cartridges 285B himself. In this case, the cumulative number of printed pages is not counted up.

Summary of Concept Disclosed

As described above, when the printer 200 is in the "contracted mode," and normal printing is performed with the contract cartridges 285A attached to the cartridge holders 280, the cumulative number of printed pages is counted up, and the number of pages used for the normal printing is subject to fee-charging. For instance, the normal printing is printing based on a print job received via an external device such as the terminal device 300 or the operation I/F 250 of the printer 200. On the other hand, even though the printer 200 is in the "contracted mode," and the contract cartridges 285A are attached to the cartridge holders 280, when an ink consumption operation other than the normal printing is performed, the cumulative number of printed pages is not counted up, and the number of pages used for the ink consumption operation is not subject to fee-charging, since the ink consumption operation is for the convenience of the manufacturer. Examples of the ink consumption operations other than the normal printing may include, but are not limited to, cleaning a nozzle head of the print engine 270 and test printing after maintenance.

Therefore, if the user uses this system to perform the normal printing using the commercial cartridges 285B in the "contracted mode" and to replace the commercial cartridges 285B with the contract cartridges 285A only when the user wants to perform cleaning or test printing, the cleaning or the test printing may be performed substantially with no charge.

To resolve the above problem, in the illustrative embodiment, when one or more commercial cartridges 285B are attached to the cartridge holders 280 in the "contracted mode," it is determined whether specific conditions for enabling the execution of the normal printing using (consuming) the commercial cartridges 285B are satisfied. When it is determined that the specific conditions are satisfied, the execution of the normal printing using the commercial cartridges 285B is allowed. Meanwhile, when it is determined that the specific conditions are not satisfied, a restriction is imposed on the execution of the normal printing using the commercial cartridges 285B. It is noted that hereinafter, "the specific conditions are not satisfied" may denote "at least one of the specific conditions is not satisfied." In the illustrative embodiment, a charging process is performed as an example of the restriction. When it is determined that the specific conditions are not satisfied, the execution of the normal printing using the commercial cartridges 285B is allowed with a charge therefor. On the other hand, when it is determined that the specific conditions are satisfied, the execution of the normal printing using the commercial cartridges 285B is allowed without any charge therefor. Namely, in the "contracted mode," it is allowed to perform the normal printing using the commercial cartridges 285B with no charge, only when the specific conditions are satisfied. Meanwhile, when the specific conditions are not satisfied, the execution of the normal printing using the commercial cartridges 285B in the "contracted mode" is subject to fee-charging. This provides the user with an incentive not to perform the normal printing using the commercial cartridges 285B in the "contracted mode" when the specific conditions are not satisfied. A detailed explanation will be provided below of control to achieve the above system.

Control Procedure

FIGS. 4 to 8B show an example of a control procedure to be performed by the controller 210 of the printer 200. The controller 210 performs a process shown in FIG. 4 in cases such as a case where the controller 210 has received a print job, a case where the controller 210 performs an ink consumption operation other than the normal printing, and a case where the controller 210 has detected a cartridge replacement operation by the user.

Figure 4:
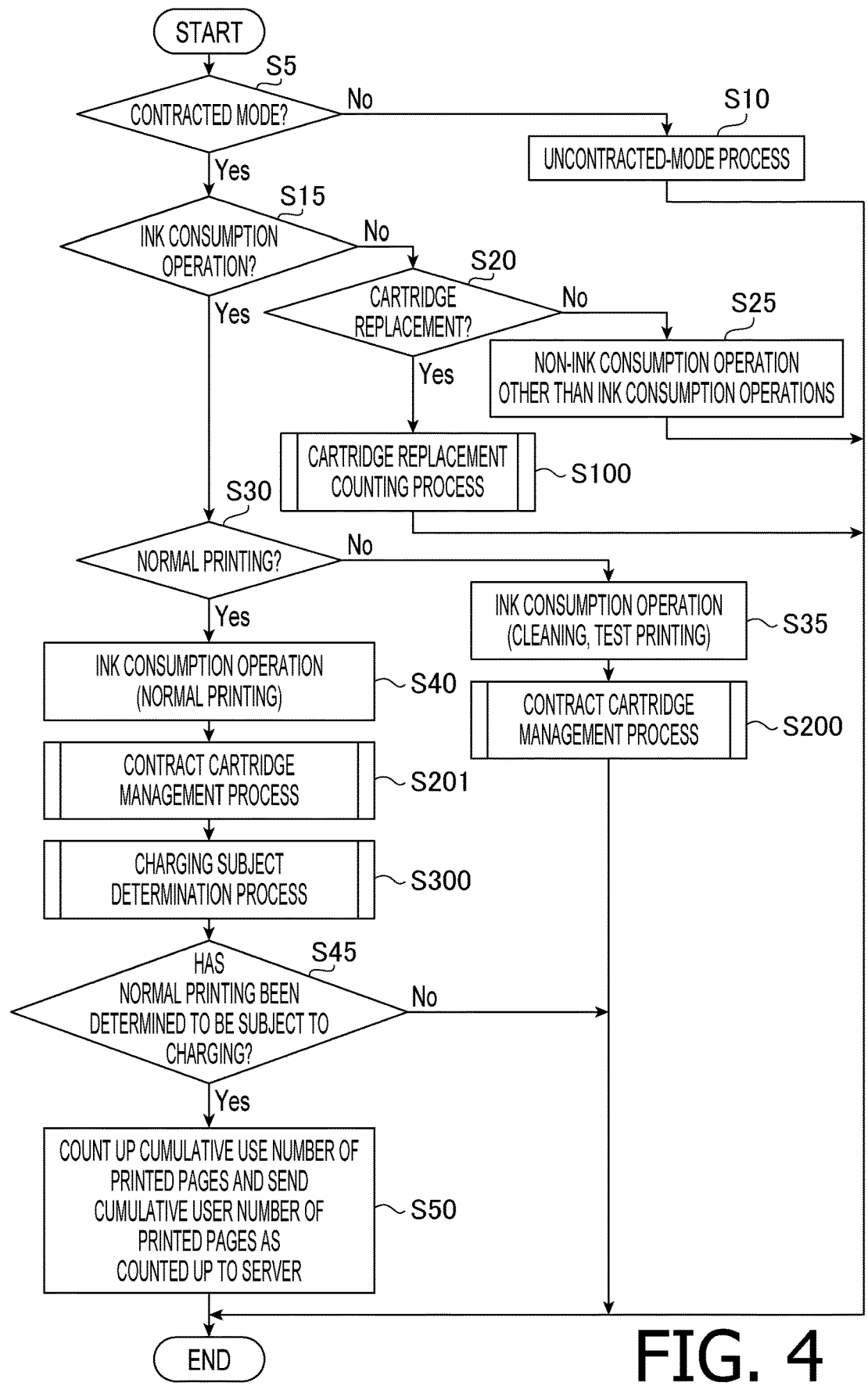
FIG. 4 is a flowchart showing an example of a control procedure to be performed by a controller of a printer.

As shown in FIG. 4, in S5, the controller 210 determines whether the printer 200 is in the "contracted mode" or the "uncontracted mode." For instance, the controller 210 makes the determination in S5 by referring to the contract information stored in the storage 215. In response to determining that the printer 200 is in the "uncontracted mode" (S5: No), the controller 210 proceeds to S10.

In S10, the controller 210 performs an uncontracted-mode process. For instance, as shown in FIG. 2, the uncontracted-mode process is a printing process to be performed based on the received print job by using (consuming) the commercial cartridges 285B with no limitation on the number of printable pages. After S10, the controller 210 terminates the process shown in FIG. 4.

On the other hand, in response to determining in S5 that the printer 200 is in the "contracted mode" (S5: Yes), the controller 210 proceeds to S15.

In S15, the controller 210 determines whether an operation to be performed or an operation detected is an ink consumption operation (e.g., printing or copying) in which ink in the cartridges 285 is used (consumed). In response to determining that the operation to be performed or the operation detected is not an ink consumption operation (S15: No), the controller 210 proceeds to S20.

In S20, the controller 210 determines whether a cartridge replacement operation has been detected. The controller 210 makes the determination in S20, for instance, by detecting with sensors that at least one of open-close covers covering the cartridge holders 280 has been closed. In response to determining that a cartridge replacement operation has not been detected (S20: No), the controller 210 proceeds to S25.

In S25, the controller 210 performs a non-ink consumption operation other than the ink consumption operations. The non-ink consumption operation is an operation (e.g., scanning or faxing) in which no ink is consumed. After S25, the controller 210 terminates the process shown in FIG. 4.

On the other hand, in response to determining in S20 that the cartridge replacement operation has been detected (S20: Yes), the controller 210 proceeds to S100.

In S100, the controller 210 performs a cartridge replacement counting process. The cartridge replacement counting process will be described in detail later (see FIG. 5). After S100, the controller 210 terminates the process shown in FIG. 4.

On the other hand, in response to determining in S15 that the operation to be performed or the operation detected is an ink consumption operation (S15: Yes), the controller 210 proceeds to S30.

In S30, the controller 210 determines whether the ink consumption operation is the aforementioned normal printing. In response to determining that the ink consumption operation is not the normal printing (S30: No), the controller 210 proceeds to S35.

In S35, the controller 210 executes the ink consumption operation (e.g., cleaning the nozzle head of the print engine 270 or test printing after maintenance) different from the normal printing.

In S200, the controller 210 performs a contract cartridge management process. The contract cartridge management process will be described in detail later (see FIG. 6). After S200, the controller 210 terminates the process shown in FIG. 4.

On the other hand, in response to determining in S30 that the ink consumption operation is the normal printing (S30: Yes), the controller 210 proceeds to S40.

In S40, the controller 210 performs, as the ink consumption operation, the normal printing, for instance, printing based on a print job received via an external device (e.g., the terminal device 300) or the operation I/F 250 of the printer 200.

In S201, the controller 210 performs the contract cartridge management process. The contract cartridge management process will be described in detail later (see FIG. 6).

In S300, the controller 210 performs a charging subject determination process. The charging subject determination process will be described in detail later (see FIGS. 8A and 8B).

In S45, the controller 210 determines whether the normal printing has been determined to be subject to fee-charging in the aforementioned step S300. In response to determining that it has been determined in S300 that specific conditions are satisfied and that the normal printing is not subject to fee-charging (S45: No), the controller 210 terminates the process shown in FIG. 4. In this case, the execution of the normal printing using (consuming) the commercial cartridges 285B is allowed. On the other hand, in response to determining in S300 that the specific conditions are not satisfied and that the normal printing using the commercial cartridges 285B is subject to fee-charging (S45: Yes), the controller 210 proceeds to S50. As described above, it is noted that "the specific conditions are not satisfied" may denote "at least one of the specific conditions is not satisfied."

In S50, the controller 210 counts up the cumulative number of printed pages and sends to the server 100 the cumulative number of printed pages as counted up. Thus, a fee is charged for the execution of the normal printing using (consuming) the commercial cartridges 285B. In other words, a restriction is imposed on the execution of the normal printing using the commercial cartridges 285B. After S50, the controller 210 terminates the process shown in FIG. 4.

Figure 5:
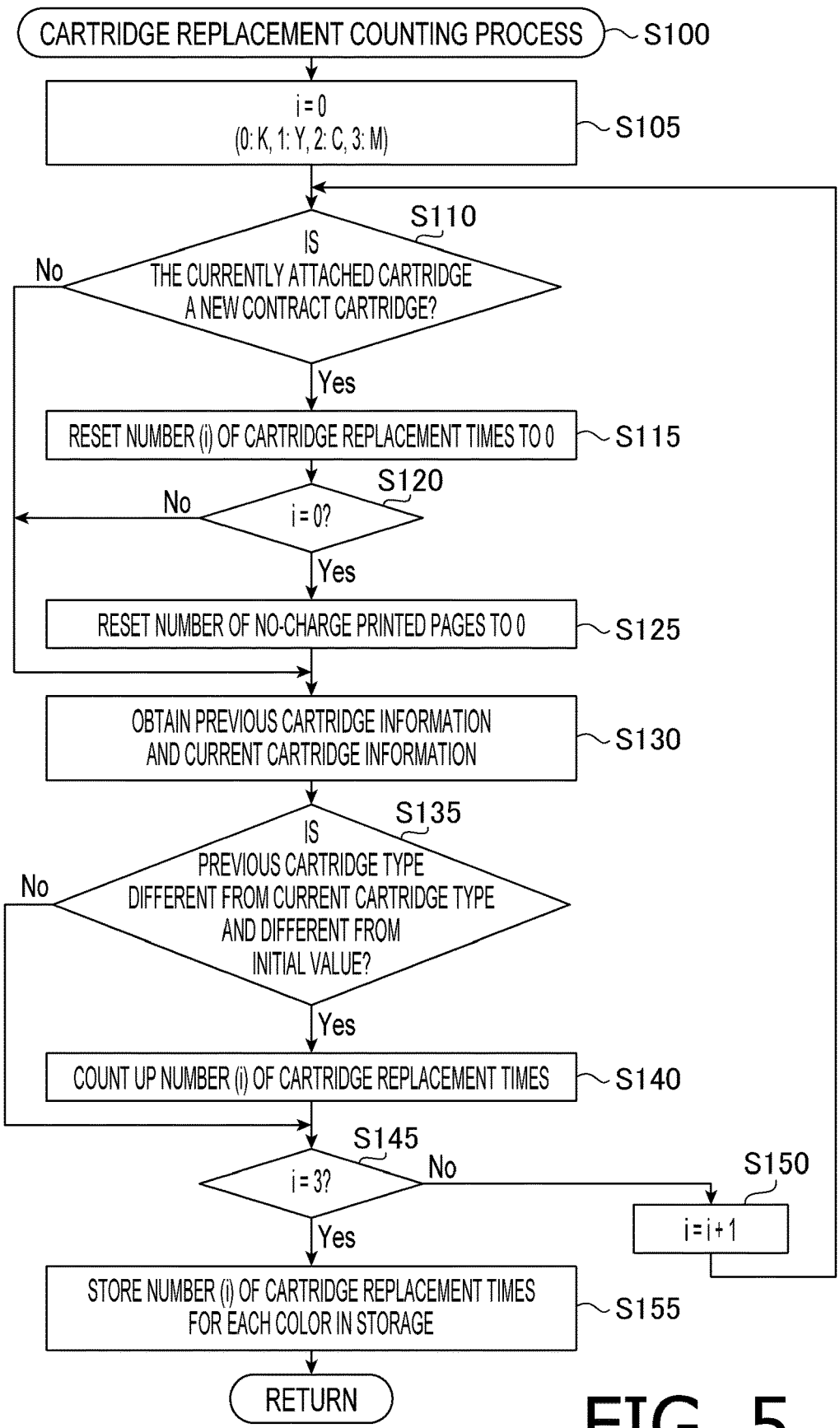
FIG. 5 is a flowchart showing an example of a detailed procedure of a cartridge replacement counting process.

FIG. 5 shows an example of a detailed procedure of the cartridge replacement counting process in S100. As shown in FIG. 5, in S105, the controller 210 sets a variable i to 0. The variable i represents one of the ink colors of the cartridges 285. For instance, when set to 0, the variable i represents K (black). When set to 1, the variable i represents Y (yellow). When set to 2, the variable i represents C (cyan). When set to 3, the variable i represents M (magenta).

In S110, the controller 210 determines whether or not the cartridge 285 currently attached to the corresponding cartridge holder 280 is a contract cartridge 285A and a new cartridge (i.e., whether the currently attached cartridge 285 is a new contract cartridge 285A), based on the cartridge information detected by the corresponding cartridge sensor 290. When the currently attached cartridge 285 is determined to be a contract cartridge 285A, it is determined whether the contract cartridge 285A is a new cartridge, for instance, based on an ink consumption amount included in the cartridge information. In response to determining that the currently attached cartridge 285 is a commercial cartridge 285B or that the currently attached cartridge 285 is a contract cartridge 285A but not a new cartridge (S110: No), the controller 210 proceeds to S130. Meanwhile, in response to determining that the currently attached cartridge 285 is a contract cartridge 285A and a new cartridge (S110: Yes), the controller 210 proceeds to S115.

In S115, the controller 210 resets the number (i) of cartridge replacement times to 0. The number (i) of cartridge replacement times is stored in the storage 215 for each of the four colors represented by the values of 0 to 3 to be taken by the variable i. In S115, the number (i) of cartridge replacement times for the processing target color among them is reset.

In S120, the controller 210 determines whether the variable i is 0, that is, whether the ink color of the cartridge 285 attached to the cartridge holder 280 is black. In response to determining that the variable i is not 0, i.e., the ink color is not black (S120: No), the controller 210 proceeds to S130. Meanwhile, in response to determining that the variable i is 0, i.e., the ink color is black (S120: Yes), the controller 210 proceeds to S125.

In S125, the controller 210 resets the number of no-charge printed pages to 0. The number of no-charge printed pages is the number of printed pages in a case where the normal printing performed using the commercial cartridges 285B in the "contracted mode" is determined not to be subject to fee-charging as the specific conditions are satisfied. The number of no-charge printed pages is counted to determine whether the number of no-charge printed pages, which is an example of the specific conditions, is less than 50 (see S340 in FIG. 8B). In S125, the number of no-charge printed pages is reset when the cartridge 285 for the ink color of black has been replaced with a new contract cartridge 285A.

In S130, the controller 210 obtains previous cartridge information before the cartridge replacement and current cartridge information after the cartridge replacement. For instance, the previous cartridge information is stored in a particular area of the storage 215. The previous cartridge information is updated to cartridge information after cartridge replacement each time the cartridge 285 is replaced.

In S135, based on the obtained cartridge information (i.e., the previous cartridge information and the current cartridge information), the controller 210 determines whether or not a previous cartridge type is different from a current cartridge type and different from an initial value. The cartridge type is either the contract cartridge 285A or the commercial cartridge 285B. For instance, the initial value is 0. The initial value is recorded as the previous cartridge type when the cartridge 285 is first attached to the cartridge holder 280. In response to determining that the previous cartridge type is identical to the current cartridge type or that the previous cartridge type is different from the current cartridge type but is the initial value (S135: No), the controller 210 proceeds to S145. Meanwhile, in response to determining that the previous cartridge type is different from the current cartridge type and different from the initial value (S135: Yes), the controller 210 proceeds to S140.

In S140, the controller 210 counts up the number (i) of cartridge replacement times. As described above, the number (i) of cartridge replacement times is stored in the storage 215 for each of the four colors represented by the values of 0 to 3 to be taken by the variable i. In S140, the number (i) of cartridge replacement times for the processing target color among them is counted up.

In S145, the controller 210 determines whether the variable i is 3. In response to determining that the variable i is not 3 (S145: No), the controller 210 increments the variable i by one in S150. Thereafter, the controller 210 goes back to S110, and executes the steps S110 to S140 for the incremented variable i. Namely, the controller 210 repeatedly executes the steps S110 to S140 for each of the four colors represented by the values of 0 to 3 to be taken by the variable i. Meanwhile, in response to determining that the variable i is 3 (S145: Yes), the controller 210 proceeds to S155.

In S155, the controller 210 stores the number (i) of cartridge replacement times as counted up in S140 for each of the four colors, in the particular area of the storage 215. Thereafter, the controller 210 returns to the flowchart shown in FIG. 4.

Figure 6:
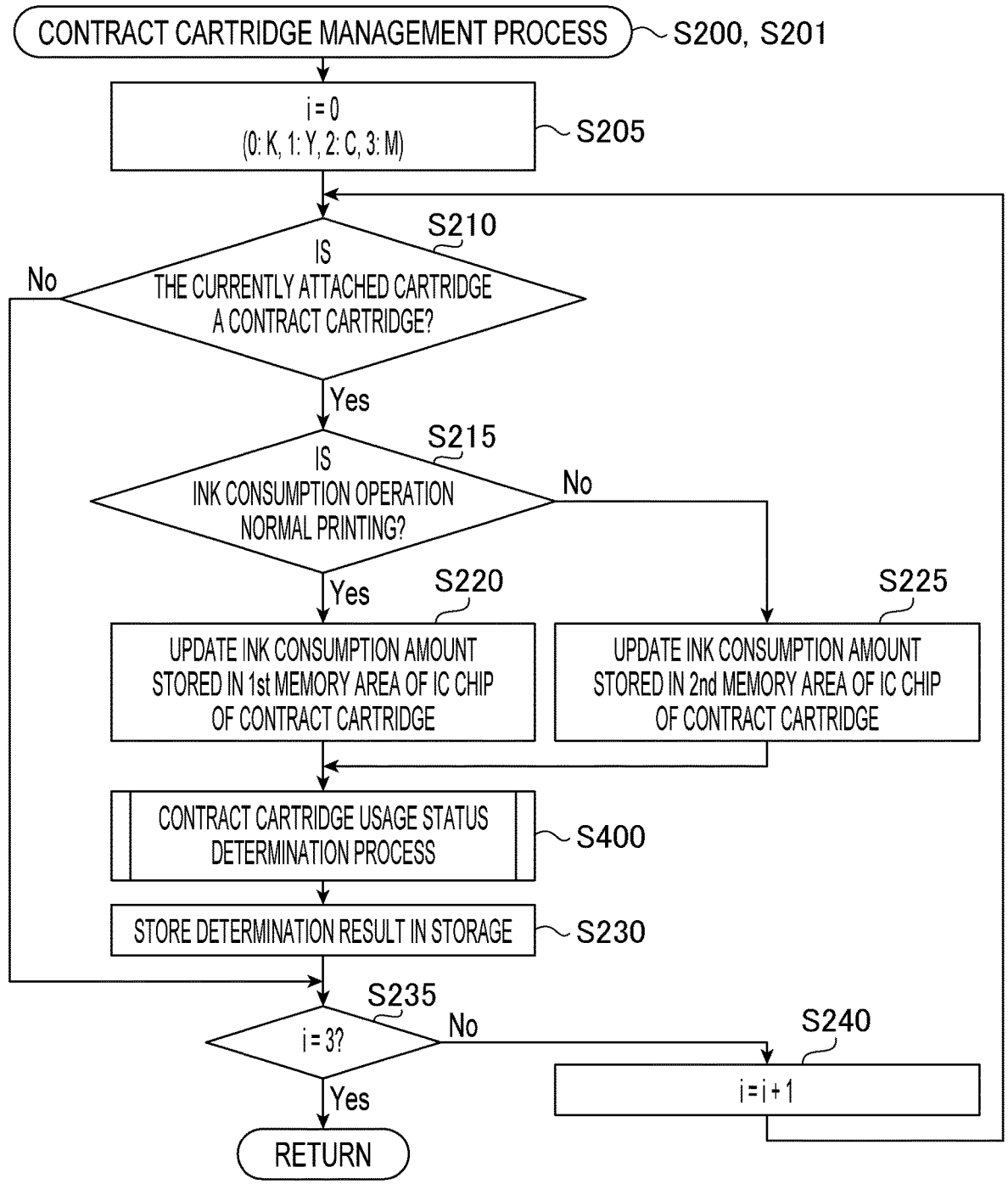
FIG. 6 is a flowchart showing an example of a detailed procedure of a contract cartridge management process.

FIG. 6 shows an example of a detailed procedure of the contract cartridge management process in S200 and S201. As shown in FIG. 6, in 205, the controller 210 sets a variable i to 0. The variable i represents one of the ink colors of the cartridges 285. For instance, when set to 0, the variable i represents K (black). When set to 1, the variable i represents Y (yellow). When set to 2, the variable i represents C (cyan). When set to 3, the variable i represents M (magenta).

In S210, the controller 210 determines whether the cartridge 285 currently attached to the corresponding cartridge holder 280 is a contract cartridge 285A, based on the cartridge information detected by the corresponding cartridge sensor 290. In response to determining that the cartridge 285 currently attached to the corresponding cartridge holder 280 is a commercial cartridge 285B (S210: No), the controller 210 proceeds to S235. Meanwhile, in response to determining that the cartridge 285 currently attached to the corresponding cartridge holder 280 is a contract cartridge 285A (S210: Yes), the controller 210 proceeds to S215.

In S215, the controller 210 determines whether the ink consumption operation is the normal printing. In response to determining that the ink consumption operation is the normal printing (S215: Yes), the controller 210 proceeds to S220.

In S220, the controller 210 updates, by the cartridge sensor 290, the ink consumption amount stored in a first memory area of the IC chip of the contract cartridge 285A attached to the cartridge holder 280 by adding thereto an amount of ink consumed in the aforementioned step S40. The first memory area is an area to store information related to the normal printing. After S220, the controller 210 proceeds to S400.

On the other hand, in response to determining in S215 that the ink consumption operation is not the normal printing (S215: No), the controller 210 proceeds to S225.

In step S225, the controller 210 updates, by the cartridge sensor 290, the ink consumption amount stored in a second memory area of the IC chip of the contract cartridge 285A attached to the cartridge holder 280 by adding thereto an amount of ink consumed in the aforementioned step S35. The second memory area is an area to store information related to the ink consumption operations other than the normal printing. After S225, the controller 210 proceeds to S400.

In S400, the controller 210 performs a contract cartridge usage status determination process. The contract cartridge usage status determination process will be described in detail later (see FIG. 7).

In S230, the controller 210 stores a determination result obtained in S400 into a particular area of the storage 215.

In S235, the controller 210 determines whether the variable i is 3. In response to determining that the variable i is not 3 (S235: No), the controller 210 increments the variable i by one in S240. Thereafter, the controller 210 goes back to S210, and executes the steps S210 to S230 for the incremented variable i. Namely, the controller 210 repeatedly executes the steps S210 to S230 for each of the four colors represented by the values of 0 to 3 to be taken by the variable i. Meanwhile, in response to determining that the variable i is 3 (S235: Yes), the controller 210 returns to the flowchart shown in FIG. 4.

Figure 7:
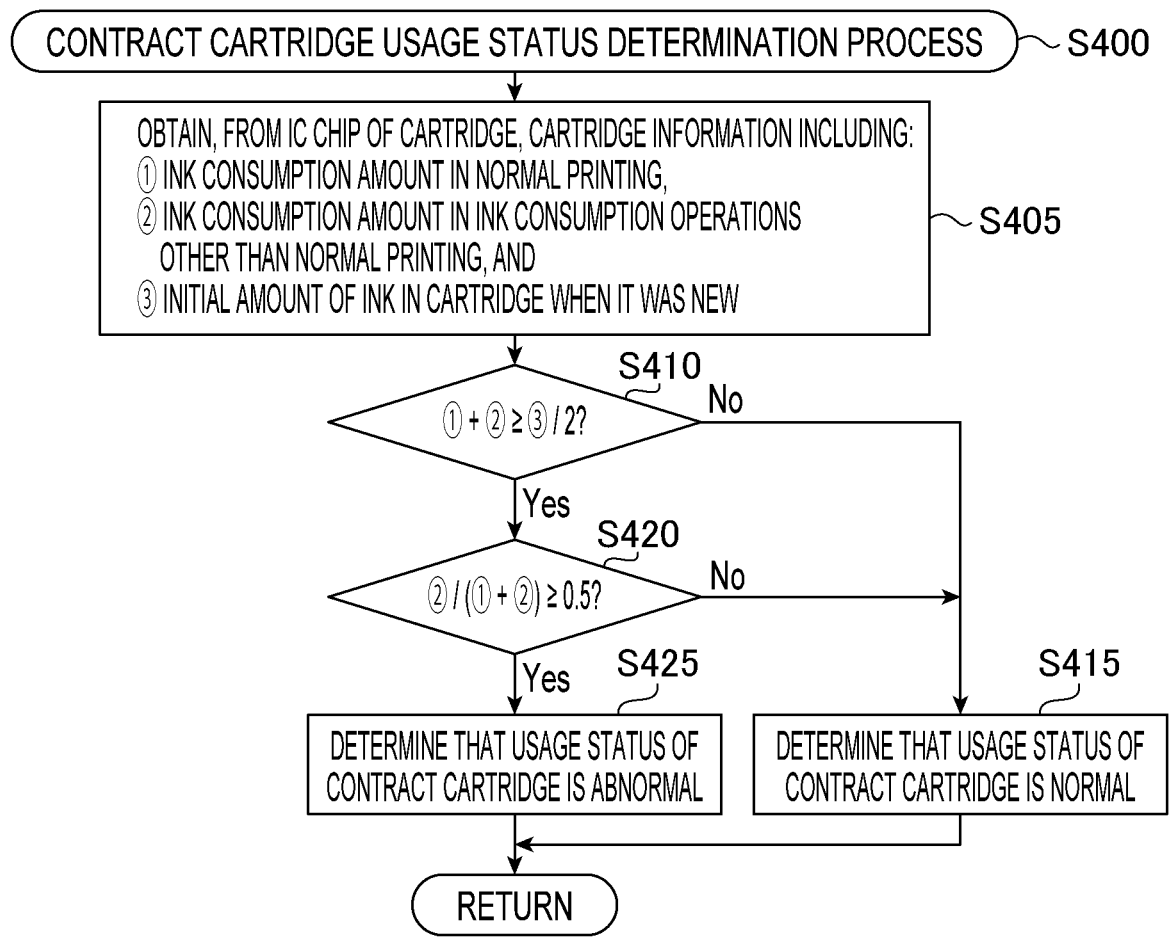
FIG. 7 is a flowchart showing an example of a detailed procedure of a contract cartridge usage status determination process.

FIG. 7 shows an example of a detailed procedure of the contract cartridge usage status determination process in S400. As shown in FIG. 7, in S405, the controller 210 obtains, by the cartridge sensor 290, the cartridge information from the IC chip of the cartridge 285 currently attached to the cartridge holder 280. The cartridge information includes the ink consumption amount in the normal printing that has been written in the first memory area in the aforementioned step S220, the ink consumption amount in the ink consumption operation(s) other than the normal printing that has been written in the second memory area in the aforementioned step S225, and an initial amount of ink in the cartridge 285 (hereinafter referred to as the "initial ink amount") when the cartridge 285 was new that has been written in advance in the IC chip.

In S410, based on the cartridge information obtained in S405, the controller 210 determines whether a sum of the ink consumption amount in the normal printing and the ink consumption amount in the ink consumption operation(s) other than the normal printing is equal to or more than ½ of the initial ink amount when the cartridge 285 was new. The above value of ½ is merely an example. Practicable examples of the value according to aspects of the present disclosure may include other values than ½ as long as they are effective to determine that the ink in the cartridge 285 has been consumed to some extent. The determination in S410 is made because if only a small amount of ink in the cartridge 285 is consumed, it may not be possible to make an accurate determination in the after-mentioned step S420. In response to determining that the sum of the ink consumption amount in the normal printing and the ink consumption amount in the ink consumption operation(s) other than the normal printing is less than ½ of the initial ink amount when the cartridge 285 was new (S410: No), the controller 210 proceeds to S415.

In S415, the controller 210 determines that a usage status of the contract cartridge 285A is normal. Thereafter, the controller 210 returns to the flowchart shown in FIG. 6.

On the other hand, in response to determining in S410 that the sum of the ink consumption amount in the normal printing and the ink consumption amount in the ink consumption operation(s) other than the normal printing is equal to or more than ½ of the initial ink amount when the cartridge 285 was new (S410: Yes), the controller 210 proceeds to S420.

In S420, the controller 210 determines whether a ratio of the ink consumption amount due to the ink consumption operations other than the normal printing to the sum of the ink consumption amount due to the normal printing and the ink consumption amount due to the ink consumption operations other than the normal printing is equal to or more than 0.5. The determination in S420 is made because if the above ratio is unnaturally high, user's voluntary operations such as cleaning and test printing are assumed. The above value of 0.5 is merely an example. Practicable examples of the value according to aspects of the present disclosure may include other values than 0.5 as long as they are effective to presume that the user's voluntary operations may have been performed. In response to determining that the above ratio is less than 0.5 (S420: No), the controller 210 proceeds to S415 to determine that the usage status of the contract cartridge 285A is normal. After S415, the controller 210 returns to the flowchart shown in FIG. 6. On the other hand, in response to determining that the ratio is equal to or more than 0.5 (S420: Yes), the controller 210 proceeds to S425.

In S425, the controller 210 determines that the usage status of the contract cartridge 285A is abnormal. Thereafter, the controller 210 returns to the flowchart shown in FIG. 6.

Figure 8A:
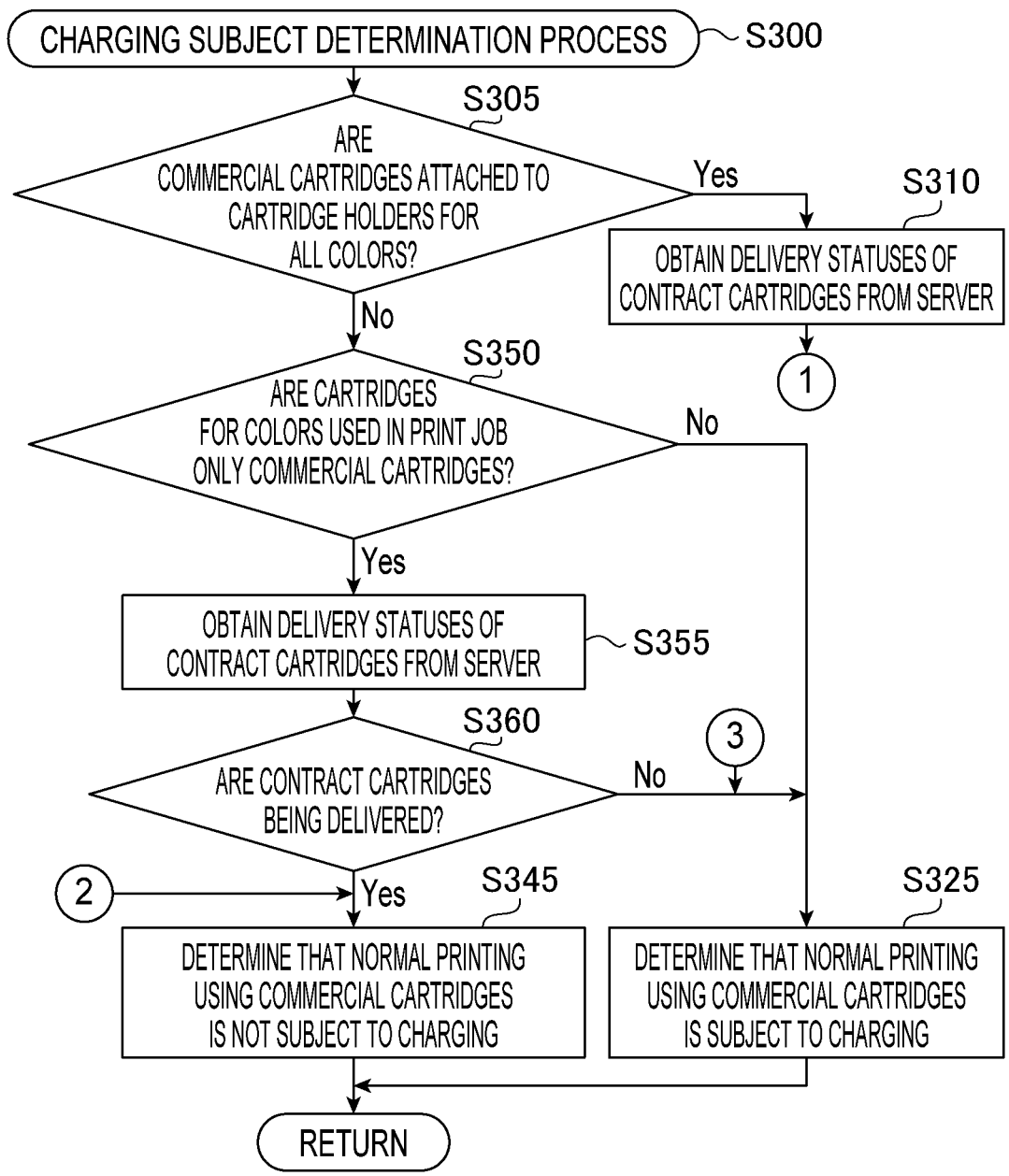
FIGS. 8A and 8B are flowcharts showing an example of a detailed procedure of a charging subject determination process.
Figure 8B:
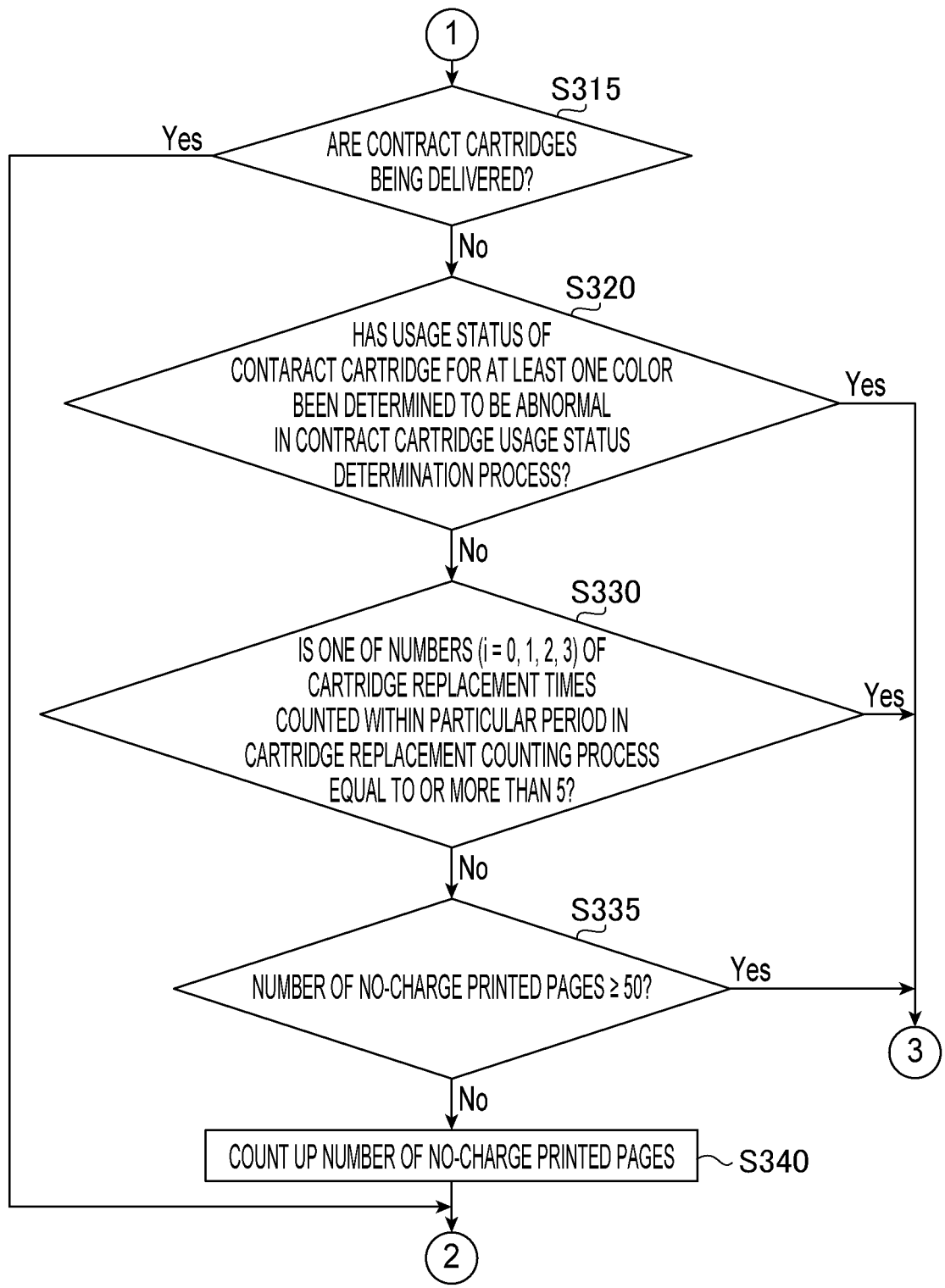

FIGS. 8A and 8B show an example of a detailed procedure of the charging subject determination process in S300. As shown in FIG. 8A, in S305, the controller 210 determines whether commercial cartridges 285B are attached to the cartridge holders 280 for all the colors, based on the cartridge information detected by the cartridge sensors 290. In response to determining that commercial cartridges 285B are attached to the cartridge holders 280 for all the colors (S305: Yes), the controller 210 proceeds to S310.

In S310, the controller 210 communicates with the server 100 via the communication I/F 260 to obtain information regarding delivery statuses of contract cartridges 285A for the printer 200 based on identification information of the printer 200.

In S315, the controller 210 determines whether new contract cartridges 285A are being delivered in response to the remaining use lives of previous contract cartridges 285A becoming equal to or less than a particular value, based on the information regarding the delivery statuses obtained in S310. In response to determining that new contract cartridges 285A are being delivered (S315: Yes), the controller 210 proceeds to S345. Meanwhile, in response to determining that new contract cartridges 285A are not being delivered (S315: No), the controller 210 proceeds to S320.

In S320, the controller 210 determines whether the usage status of the contract cartridge 285A for at least one color has been determined to be abnormal in the contract cartridge usage status determination process in S400. The controller 210 makes the determination in S320 by referring to the determination results obtained in the contract cartridge usage status determination process that are stored in the storage 215. In response to determining that the usage status of the contract cartridge 285A for at least one color has been determined to be abnormal (S320: Yes), the controller 210 determines that the specific conditions are not satisfied and proceeds to S325. As described above, it is noted that "the specific conditions are not satisfied" may denote "at least one of the specific conditions is not satisfied."

In S325, the controller 210 determines that the normal printing performed using (consuming) the commercial cartridges 285B is subject to fee-charging. Thereafter, the controller 210 returns to the flowchart shown in FIG. 4.

On the other hand, in response to determining in S320 that the usage statuses of the contract cartridges 285A for all the colors have been determined to be not abnormal (S320: No), the controller 210 determines that a condition pertaining to S320 is satisfied among the specific conditions and proceeds to S330.

In S330, the controller 210 determines whether one of the numbers (i=0, 1, 2, 3) of cartridge replacement times counted within a particular period of time in the cartridge replacement counting process (see S100) is, for instance, equal to or more than 5. The controller 210 makes the determination in S330 by referring to the numbers (i) of cartridge replacement times obtained in the cartridge replacement counting process that are stored in the storage 215. The particular period of time is, for instance, a period from the time when the number (i) of cartridge replacement times was reset to 0 in the aforementioned step S115 for each of the values of 0 to 3 to be taken by the variable i until the present time. In response to determining that one of the numbers (i=0, 1, 2, 3) of cartridge replacement times counted within the particular period of time in the cartridge replacement counting process is equal to or more than 5 (S330: Yes), the controller 210 determines that the specific conditions are not satisfied and proceeds to S325. In S325, the controller 210 determines that the normal printing performed using (consuming) the commercial cartridges 285B is subject to fee-charging.

On the other hand, in response to determining that all of the numbers (i=0, 1, 2, 3) of cartridge replacement times counted within the particular period of time in the cartridge replacement counting process are less than 5 (S330: No), the controller 210 determines that a condition pertaining to S330 is satisfied among the specific conditions and proceeds to S335. The above value of 5 is merely an example. Practicable examples of the value according to aspects of the present disclosure may include other values than 5 as long as they are values that seem unnatural as the number of cartridge replacement times.

In S335, the controller 210 determines whether the number of no-charge printed pages within a predetermined period of time is, for instance, equal to or more than 50. As described above, the number of no-charge printed pages is the number of printed pages in the case where the normal printing performed using the commercial cartridges 285B in the "contracted mode" is determined not to be subject to fee-charging as the specific conditions are satisfied. The predetermined period of time is, for instance, a period from the time when the number of no-charge printed pages was reset to 0 in S125 until the present time. In response to determining that the number of no-charge printed pages within the predetermined period of time is equal to or more than 50 (S335: Yes), the controller 210 proceeds to S325 to determine that the normal printing performed using the commercial cartridges 285B is subject to fee-charging.

On the other hand, in response to determining in S335 that the number of no-charge printed pages within the predetermined period of time is less than 50 (S335: No), the controller 210 determines that the specific conditions (including a condition pertaining to S335) are satisfied and proceeds to S340. The above value of 50 is merely an example. Practicable examples of the value according to aspects of the present disclosure may include other values than 50 depending on situations of the printing service provider.

In S340, the controller 210 counts up the number of no-charge printed pages according to the normal printing performed in S40.

In S345, the controller 210 determines that the normal printing performed using (consuming) the commercial cartridges 285B is not subject to fee-charging. Thereafter, the controller 210 returns to the flowchart shown in FIG. 4.

On the other hand, in response to determining in S305 that contract cartridges 285A are attached to the cartridge holders 280 for one or more colors (S305: No), the controller 210 proceeds to S350. The cases where contract cartridges 285A are attached to the cartridge holders 280 for one or more colors include a case where contract cartridges 285A are attached to the cartridge holders 280 for all the four colors, and a cartridge-mixed case where contract cartridges 285A are attached to the cartridge holders 280 for some (i.e., at least one but not all) of the four colors, and commercial cartridges 285B are attached to the cartridge holders 280 for the other color(s).

In S350, the controller 210 determines whether the cartridges 285 for colors used in the print job are only commercial cartridges 285B. In response to determining that the cartridges 285 for colors used in the print job include a contract cartridge 285A (S350: No), the controller 210 proceeds to S325 to determine that the normal printing performed using the commercial cartridges 285B is subject to fee-charging. Thereafter, the controller 210 returns to the flowchart shown in FIG. 4.

On the other hand, in response to determining that the cartridges 285 for colors used in the print job are only commercial cartridges 285B (S350: Yes), the controller 210 determines that a condition pertaining to S350 is satisfied among the specific conditions and proceeds to S355.

In S355, the controller 210 communicates with the server 100 via the communication I/F 260 to obtain information regarding the delivery statuses of the contract cartridges 285A for the printer 200 based on the identification information of the printer 200.

In S360, the controller 210 determines whether new contract cartridges 285A are being delivered in response to the remaining use lives of previous contract cartridges 285A becoming equal to or less than the particular value, based on the information regarding the delivery statuses obtained in S355. In response to determining that new contract cartridges 285A are being delivered (S360: Yes), the controller 210 proceeds to S345 to determine that the normal printing performed using (consuming) the commercial cartridge 285B is not subject to fee-charging. On the other hand, in response to determining that new contract cartridges 285A are not being delivered (S360: No), the controller 210 proceeds to S325 to determine that the normal printing performed using the commercial cartridge 285B is subject to fee-charging. Thereafter, the controller 210 returns to the flowchart shown in FIG. 4.

Advantageous Effects of Illustrative Embodiment

In the illustrative embodiment described above, the two types of cartridges, i.e., the contract cartridge 285A and the commercial cartridge 285B are usable. The contract cartridge 285A is a type of cartridge that is usable when the delivery contract is in effect but not usable when the delivery contract is not in effect. The commercial cartridge 285B is a type of cartridge that is different from the contract cartridge 285A and is usable regardless of whether the delivery contract is in effect. In the printer 200 of the illustrative embodiment, the controller 210 executes the step S5, the steps S315, S320, S330, S335, S350, and S360, and the steps S325 and S345. In a case where commercial cartridges are attached to the cartridge holders 280 when it is determined in S5 that the printer 200 is in the "contracted mode," the controller 210 determines in each of the steps S315, S320, S330, S335, S350, and S360 whether the specific condition pertaining to the corresponding step is satisfied. The controller 210 performs respective different control operations in the steps S325 and S345, according to the results of the determinations in the steps S315, S320, S330, S335, S350, and S360. When it is determined that the specific conditions are not satisfied, a predetermined restriction is imposed on the execution of the normal printing using (consuming) the commercial cartridges 285B attached. When it is determined that the specific conditions are satisfied, the execution of the normal printing using the commercial cartridges 285B attached is allowed.

According to the illustrative embodiment, the controller 210 performs detailed control according to various statuses such as whether the delivery contract is in effect (i.e., whether the printer 200 is in the "contracted mode" or the "uncontracted mode"), the usage statuses of the cartridges 285, and the operating status of the printer 200, thereby achieving more appropriate processing. In particular, even though the printer 200 is in the "contracted mode," when the specific conditions are satisfied, the printer 200 is allowed to perform the normal printing using (consuming) the commercial cartridges 285B.

Further, in the illustrative embodiment, in particular, when the specific conditions are not satisfied, a predetermined fee is charged as the restriction on the execution of the normal printing using (consuming) the commercial cartridges 285B attached to the cartridge holders 280. According to the illustrative embodiment, it is possible to provide the user with an incentive to use the commercial cartridges 285B in the normal printing in such a manner as to satisfy the specific conditions in order to avoid such charging, as well as to provide the user with a warning not to use the commercial cartridges 285B in the normal printing in such an inadvertent manner that the specific conditions are not satisfied.

Further, in the illustrative embodiment, in particular, when it is determined in S315 that new contract cartridges 285A are being delivered, the specific conditions (including a condition pertaining to S315) are determined to be satisfied. According to the illustrative embodiment, for instance, when the user has almost used up the contract cartridges 285A, and new contract cartridges 285A for replacement are being delivered, the situation where the commercial cartridges 285B are used in place of the contract cartridges 285A is an unavoidable situation that is not due to a user's fault. Thus, such a situation is considered as an exceptional case that is not subject to the restriction such as charging.

Further, in the illustrative embodiment, in particular, when the number of cartridge replacement times (i.e., the number of times a cartridge 285A or 285B attached to a cartridge holder 280 has been replaced with another type of cartridge 285A or 285B) within the particular period of time is unnaturally large, user's voluntary cartridge replacements are assumed. In the illustrative embodiment, if the number of cartridge replacement times within the particular period of time is equal to or more than a predetermined value, it is considered due to the user's voluntary cartridge replacements, and the specific conditions are determined not to be satisfied. According to the illustrative embodiment, when the user's voluntary cartridge replacements are assumed, the normal printing using the commercial cartridges 285B is surely subject to the restriction such as charging.

As in the illustrative embodiment, when the respective cartridges 285 for the plurality of ink colors are used in parallel, the degrees of consumption of the individual cartridges 285 are not uniform. Hence, the replacement timings of the individual cartridges 285 are different from each other. Therefore, there may be a case where contract cartridge(s) 285A and commercial cartridge(s) 285B are attached in a mixed manner at a certain same timing.

Even when the plurality of cartridges 285 are attached to the cartridge holders 280 at the same time, not all of these cartridges 285 may be used each time the printer 200 performs printing. Depending on printing modes, only some of the cartridges 285 may be used. Therefore, when contract cartridge(s) 285A and commercial cartridge(s) 285B are attached in a mixed manner, there may be cases where the contract cartridge(s) 285A are not consumed, such as a case where only the commercial cartridge(s) 285B are consumed. In such cases, the aforementioned user's voluntary operations are not assumed.

In view of the above, in the illustrative embodiment, if the contract cartridge(s) 285A are not consumed when the contract cartridge(s) 285A and the commercial cartridge(s) 285B are attached in a mixed manner, the user's voluntary operations are not assumed, and the specific conditions are determined to be satisfied. Thereby, in a case where only the commercial cartridge(s) 285B are consumed in printing when the contract cartridge(s) 285A and the commercial cartridge(s) 285B are attached in a mixed manner, the normal printing using the commercial cartridge(s) 285B is not subject to fee-charging. For instance, when a commercial cartridge 285B is attached in place of the contract cartridge 285A for black after black ink runs out, while the contract cartridges 285A for the other colors remain attached, monochrome printing is not subject to fee-charging. According to the illustrative embodiment, when the user's voluntary operations are not assumed, it is possible to ensure that the normal printing using the commercial cartridges 285B is not subject to the restriction such as charging.

As described above, even though the user's voluntary operations are not assumed, if the normal printing using the commercial cartridges 285B in the "contracted mode" is determined not to be subject to the restriction such as charging, in an unlimited manner, it is too risky for the delivery contractor and the service provider. Therefore, a certain permissible limit should be set.

In view of the above, in the illustrative embodiment, if the quantity of the commercial cartridges 285B consumed in the normal printing within the particular period of time is equal to or more than a predetermined value, it is considered as an exception to the above restriction rule (i.e., the rule under which, if the user's voluntary operations are not assumed, the normal printing using the commercial cartridges 285B is not subject to the restriction such as charging), and the specific conditions are determined not to be satisfied. According to the illustrative embodiment, it is possible to surely avoid the risk for the delivery contractor and the service provider, regardless of whether the user's voluntary operations are assumed.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

Modifications

In the aforementioned illustrative embodiment, in S100, the number of cartridge replacement times (i.e., the number of times a cartridge 285A or 285B attached to a cartridge holder 280 has been replaced with another type of cartridge 285A or 285B) is counted. However, instead of the number of cartridge replacement times, for instance, the number of cartridge attachment times (i.e., the number of times the commercial cartridge 285B has been attached to the cartridge holder 280) may be counted. In this case, it may be determined in S135 whether the current cartridge type is the commercial cartridge 285B, in addition to whether or not the previous cartridge type is different from the current cartridge type and different from the initial value. Then, when an affirmative determination has been made in S135 (S135: Yes), the number of cartridge attachment times may be counted up in S140.

If the number of cartridge attachment times is unnaturally large within the particular period of time, user's voluntary use of the commercial cartridges 285B is assumed. In the modification, if the number of cartridge attachment times is equal to or more than a predetermined value, it may be considered due to the user's voluntary use of the commercial cartridges 285B, and the specific conditions may be determined not to be satisfied. According to the modification, when the user's voluntary use of the commercial cartridges 285B is assumed, it is possible to ensure that the normal printing using the commercial cartridges 285B is subject to the restriction such as charging.

In the aforementioned illustrative embodiment, in S315 and S345, in response to determining that new contract cartridges 285A are being delivered (S315: Yes), the controller 210 of the printer 200 determines that the specific conditions are satisfied and that the normal printing using the commercial cartridges 285B is not subject to fee-charging (S345). However, practicable examples according to aspects of the present disclosure are not limited thereto. For instance, when commercial cartridges 285B have been attached to the cartridge holders 280 in place of the previous contract cartridges 285A in response to the remaining use lives of the previous contract cartridges 285A becoming equal to or less than the particular value, the controller 210 may determine that the specific conditions are satisfied and that the normal printing using the commercial cartridges 285B is not subject to fee-charging.

In the aforementioned illustrative embodiment, charging has been described as an example of the restriction on the execution of the normal printing using (consuming) the commercial cartridges 285B. However, practicable examples of the restriction other than charging according to aspects of the present disclosure may include, but are not limited to, prohibition of the execution of the normal printing using the commercial cartridges 285B. In this case, for instance, in the flowchart shown in FIG. 4, the controller 210 may determine in S45 whether the normal printing using the commercial cartridges 285B is subject to the restriction, according to the result of the determination in S300. Then, in response to determining in S45 that the normal printing using the commercial cartridges 285B is not subject to the restriction, the controller 210 may perform the ink consumption operation in S40. Meanwhile, in response to determining in S45 that the normal printing using the commercial cartridges 285B is subject to the restriction, the controller 210 may prohibit the ink consumption operation.

In the aforementioned illustrative embodiment, the example case has been described in which the printer 200 is an inkjet printer, the cartridges 285 (and ink in the cartridges 285) are consumables, and the cartridge holders 280 are consumable receptacles. However, practicable examples according to aspects of the present disclosure are not limited thereto. For instance, the printer 200 may be a laser printer. In this case, toner cartridges (and toner in the toner cartridges) may be consumables, and toner cartridge holders may be consumable receptacles. In another instance, the printer 200 may be a type of printer having ink tanks each of which is configured to be supplied with ink from a bottle. In this case, ink itself may be a consumable, and the ink tanks may be consumable receptacles. A delivery contract for consumables other than ink cartridges may be concluded. In this case, examples of the consumables other than the ink cartridges may include, but are not limited to, printing sheets, developing rollers, fixing rollers, conveyance rollers, and print heads. Further, in this case, examples of the consumable receptacles may include, but are not limited to, a feed tray, and roller holders for each type of rollers.

In the aforementioned illustrative embodiment, the example case has been described in which the printer 200 to perform printing is a processing apparatus to perform particular processes. However, practicable examples of the processing apparatus according to aspects of the present disclosure are not limited thereto. Practicable examples of the processing apparatus may include, but are not limited to, a fax machine to perform an image sending process and an image receiving process, and an image scanner to perform an image scanning process, as well as a printer. Further, practicable examples of the processing apparatus may include, but are not limited to, an electrical vehicle to perform a traveling-related process with a battery as a consumable, and an electronic cigarette to perform a smoking-related process with an electronic cigarette cartridge as a consumable, in addition to office automation equipment.

Practicable procedures of the flowcharts shown in FIGS. 4 to 8B are not limited to the procedures described in the aforementioned illustrative embodiment, but may be modified by adding steps thereto, deleting steps therefrom, and/or changing the sequence of the steps, within the spirit and scope of the inventive concepts as expressed herein.

The configurations and methods described in the aforementioned illustrative embodiment and modifications may be applied in combination as appropriate.

The following shows examples of associations between elements illustrated in the aforementioned illustrative embodiment(s) and modification(s), and elements claimed according to aspects of the present disclosure. For instance, the printer 200 may be an example of a "processing apparatus" according to aspects of the present disclosure. Each contract cartridge 285A may be included in examples of "consumables" according to aspects of the present disclosure. Each contract cartridge 285A may be an example of an "exclusive consumable" according to aspects of the present disclosure, and may be an example of an "exclusive printing consumable" according to aspects of the present disclosure. Each commercial cartridge 285B may be included in the examples of the "consumables" according to aspects of the present disclosure. Each commercial cartridge 285B may be an example of a "non-exclusive consumable" according to aspects of the present disclosure, and may be an example of a "non-exclusive printing consumable" according to aspects of the present disclosure. The controller 210 may be an example of a "controller" according to aspects of the present disclosure. Each cartridge holder 280 may be an example of a "consumable receptacle" according to aspects of the present disclosure. The normal printing using (consuming) the commercial cartridges 285B when the printer 200 is in the contracted mode may be an example of a "first particular process using a non-exclusive consumable" according to aspects of the present disclosure. The normal printing using (consuming) the contract cartridges 285B when the printer 200 is in the contracted mode may be an example of a "second particular process using an exclusive consumable" according to aspects of the present disclosure.

What is claimed is:

1. A processing apparatus comprising:
a consumable receptacle configured to hold any of a first consumable and a second consumable, the first consumable being an exclusive consumable usable when the processing apparatus is in a contracted status where a delivery contract for consumables is in effect but unusable when the processing apparatus is in an uncontracted status where the delivery contract is not in effect, the second consumable being a non-exclusive consumable different from the exclusive consumable; and
a controller configured to:
determine whether the processing apparatus is in the contracted status or in a second status different from the first status;
in response to determining that the processing apparatus is in the first status, determine whether a specific condition for execution of a first particular process using the non-exclusive consumable is satisfied, when the non-exclusive consumable is held in the consumable receptacle; and determine whether to allow or restrict the execution of the first particular process using the non-exclusive consumable depending on whether the specific condition is satisfied, thereby allowing the execution of the first particular process in response to determining that the specific condition is satisfied, whereas imposing a restriction on the execution of the first particular process in response to determining that the specific condition is not satisfied.

2. The processing apparatus according to claim 1, wherein the controller is further configured to:

when the exclusive consumable is held in the consumable receptacle in the contracted status, perform a second particular process using the exclusive consumable, with a charge for the second particular process;

when the non-exclusive consumable is held in the consumable receptacle in the contracted status, perform the first particular process using the non-exclusive consumable with a charge, imposed as the restriction, for the first particular process, in response to determining that the specific condition is not satisfied; and when the non-exclusive consumable is held in the consumable receptacle in the contracted status, perform the first particular process using the non-exclusive consumable with no charge, in response to determining that the specific condition is satisfied.

3. The processing apparatus according to claim 1, wherein the controller is further configured to:

determine that the specific condition is satisfied in a case where, in response to a remaining use life of the exclusive consumable held in the consumable receptacle becoming equal to or less than a particular value, the non-exclusive consumable has been held in the consumable receptacle in place of the exclusive consumable or a new exclusive consumable is being delivered based on the delivery contract.

4. The processing apparatus according to claim 1, wherein the controller is further configured to:

count a number of consumable-held times the non-exclusive consumable is held in the consumable receptacle;

determine that the specific condition is not satisfied when the number of consumable-held times counted within a particular period of time is equal to or more than a predetermined value; and determine that the specific condition is satisfied when the number of consumable-held times counted within the particular period of time is less than the predetermined value.

5. The processing apparatus according to claim 1, further comprising another consumable receptacle, wherein the controller is further configured to:

determine that the specific condition is satisfied when the exclusive consumable is not used in a state where the exclusive consumable and the non-exclusive consumable are held in the consumable receptacles when the processing apparatus is in the contracted status.

6. The processing apparatus according to claim 1, wherein the controller is further configured to:

determine that the specific condition is not satisfied when an amount of the non-exclusive consumable used in the first particular process within a predetermined period of time is equal to or more than a specified value; and determine that the specific condition is satisfied when the amount of the non-exclusive consumable used in the first particular process within the predetermined period of time is less than the specified value.

7. The processing apparatus according to claim 1, further comprising a print engine configured to perform printing including a first printing process as the first particular process, wherein the consumable receptacle is configured to hold any of an exclusive printing consumable as the exclusive consumable and a non-exclusive printing consumable as the non-exclusive consumable, and wherein the controller is further configured to:

in response to determining that the processing apparatus is in the contracted status, determine whether the specific condition for execution of the first printing process is satisfied, when the non-exclusive printing consumable is held in the consumable receptacle;

allow the execution of the first printing process using the non-exclusive printing consumable, in response to determining that the specific condition is satisfied; and impose a restriction on the execution of the first printing process using the non-exclusive printing consumable, in response to determining that the specific condition is not satisfied.

8. A non-transitory computer-readable storage medium storing computer-readable instructions that are executable by a controller of a processing apparatus comprising a consumable receptacle, the instructions being configured to, when executed by the controller, cause the processing apparatus to:

determine whether the processing apparatus is in a contracted status where a delivery contract for consumables is in effect or in an uncontracted status where the delivery contract is not in effect, the uncontracted status being different from the contracted status, wherein the consumable receptacle is configured to hold any of a first consumable and a second consumable, the first consumable being an exclusive consumable usable when the processing apparatus is in the contracted status but unusable when the processing apparatus is in the uncontracted status, and the second consumable being a non-exclusive consumable that is different from the exclusive consumable;

in response to determining that the processing apparatus is in the contracted status, determine whether a specific condition for execution of a first particular process using the non-exclusive consumable is satisfied, when the non-exclusive consumable is held in the consumable receptacle; and determine whether to allow or restrict the execution of the first particular process using the non-exclusive consumable depending on whether the specific condition is satisfied, thereby allowing the execution of the first particular process in response to determining that the specific condition is satisfied, whereas imposing a restriction on the execution of the first particular process in response to determining that the specific condition is not satisfied.

9. A method implementable on a controller of a processing apparatus comprising a consumable receptacle, the method comprising:

determining whether the processing apparatus is in a contracted status where a delivery contract for consumables is in effect or in an uncontracted status where the delivery contract is not in effect, the uncontracted status being different from the contracted status, wherein the consumable receptacle is configured to hold any of a first consumable and a second consumable, the first consumable being an exclusive consumable usable when the processing apparatus is in the contracted status, the second consumable being a non-exclusive consumable that is different from the exclusive consumable;

in response to determining that the processing apparatus is in the contracted status, determining whether a specific condition for execution of a first particular process using the non-exclusive consumable is satisfied, when the non-exclusive consumable is held in the consumable receptacle; and determining whether to allow or restrict the execution of the first particular process using the non-exclusive consumable depending on whether the specific condition is satisfied, thereby allowing the execution of the first particular process in response to determining that the specific condition is satisfied, whereas imposing a restriction on the execution of the first particular process in response to determining that the specific condition is not satisfied.

* * * * *